(12) United States Patent
Caiafa et al.

(10) Patent No.: US 10,262,829 B2
(45) Date of Patent: Apr. 16, 2019

(54) PROTECTION CIRCUIT ASSEMBLY AND METHOD FOR HIGH VOLTAGE SYSTEMS

(71) Applicant: General Electric Company, Schenectady, NY (US)

(72) Inventors: Antonio Caiafa, Albany, NY (US); Phillipe Ernest, Buc (FR); Dominique Poincloux, Buc (FR); Uwe Wiedmann, Niskayuna, NY (US); Denis Perrillat-Amee, Buc (FR)

(73) Assignee: General Electric Company, Schenectady, NY (US)

( * ) Notice: Subject to any disclaimer, the term of this patent is extended or adjusted under 35 U.S.C. 154(b) by 273 days.

(21) Appl. No.: 15/249,030

(22) Filed: Aug. 26, 2016

(65) Prior Publication Data

US 2017/0170652 A1 Jun. 15, 2017

Related U.S. Application Data

(60) Provisional application No. 62/266,836, filed on Dec. 14, 2015.

(51) Int. Cl.
| | |
|---|---|
| *H02H 9/00* | (2006.01) |
| *H02H 1/04* | (2006.01) |
| *H03K 17/081* | (2006.01) |
| *H01J 35/08* | (2006.01) |
| *H05G 1/34* | (2006.01) |
| *H05G 1/54* | (2006.01) |
| *H02H 9/04* | (2006.01) |

(52) U.S. Cl.
CPC ............ *H01J 35/08* (2013.01); *H02H 9/042* (2013.01); *H02H 9/043* (2013.01); *H05G 1/34* (2013.01); *H05G 1/54* (2013.01)

(58) Field of Classification Search
CPC ......... H01J 35/08; H02H 9/042; H02H 9/043; H05G 1/34; H05G 1/54
See application file for complete search history.

(56) References Cited

U.S. PATENT DOCUMENTS

| | | | |
|---|---|---|---|
| 4,390,831 A | 6/1983 | Byrd et al. | |
| 5,107,187 A | 4/1992 | Miscikowski | |
| 5,999,424 A * | 12/1999 | Schutten | H02M 3/3376 363/16 |

(Continued)

OTHER PUBLICATIONS

IXYS, Breakover Diodes; 2000, H-1-H-7.

*Primary Examiner* — Zeev V Kitov (74) *Attorney, Agent, or Firm* — Ernest G. Cusick (57) ABSTRACT

A circuit assembly and method use a breakover device that changes states in response to a change in electric energy in a helper circuit that supplies current from a power source to a powered system. The helper circuit includes an inductive element connected with the powered system. The breakover device is in a non-conducting state prior to a discharge event from the powered system to prevent the current from the power source from being conducted through the resistive element. The breakover device changes to a conducting state responsive to the powered system discharging current into the helper circuit. The breakover device conducts the current that is discharged from the powered system through the resistive element to reduce the electric energy in the helper circuit from the current that is discharged.

20 Claims, 5 Drawing Sheets

(56) References Cited

U.S. PATENT DOCUMENTS

| | | | |
|---|---|---|---|
| 6,021,051 A * | 2/2000 | Laskai | H02M 3/33507 |
| | | | 363/20 |
| 6,141,224 A * | 10/2000 | Xia | H02M 3/33576 |
| | | | 363/16 |
| 6,215,251 B1 | 4/2001 | Orchard-Webb | |
| 6,268,639 B1 | 7/2001 | Li et al. | |
| 6,377,476 B1 | 4/2002 | Fraidlin et al. | |
| 7,668,295 B2 | 2/2010 | Tang et al. | |
| 8,208,275 B2 | 6/2012 | Goins et al. | |
| 8,593,777 B1 | 11/2013 | Li | |
| 8,867,180 B2 | 10/2014 | LePort | |
| 9,160,325 B2 | 10/2015 | Caiafa et al. | |
| 2013/0105951 A1 | 5/2013 | Popovich et al. | |
| 2015/0207415 A1 | 7/2015 | Caiafa et al. | |

\* cited by examiner

PROTECTION CIRCUIT ASSEMBLY AND METHOD FOR HIGH VOLTAGE SYSTEMS

CROSS-REFERENCE TO RELATED APPLICATIONS

This application claims priority to U.S. Application No. 62/266,836, the entire disclosure of which is incorporated herein by reference.

FIELD

Embodiments of the subject matter described herein relate to circuit assemblies, such as circuits that protect components connected with high voltage systems.

BACKGROUND

Some powered systems are supplied with high voltages to perform various operations, such as computerized axial tomography (CAT or CT) systems or other systems. These types of systems may receive high voltages on the order of one hundred thousand volts or more and, in some instances, up to 140,000 volts or another amount. Control units such as gate drivers having active switches or other sensitive electronics can be used to control the supply of voltage to the powered systems.

Over time, the powered systems may begin occasionally discharging unwanted voltages into the circuit that connects the control units with the powered systems. For example, the x-ray tubes in some CT systems may occasionally become dirty and can cause a high voltage discharge to be conducted into the circuits connecting the CT systems with the gate drivers. During a spit, the x-ray tube may operate or appear as a short circuit at the output of the circuit. This leads to a high voltage difference, and the gate drives typically are not dimensioned for such a large voltage difference. This implies that even if the powered system does not operate as a high voltage generator, the energy already stored in the circuit itself may be sufficient to damage the active switches and/or gate drives.

BRIEF DESCRIPTION

In one embodiment, a circuit assembly includes a breakover device and a resistive element. The breakover device is configured to change states from a non-conducting state to a conducting state responsive to a change in voltage applied to a helper circuit that can exchange energy with and store energy from a powered system. The helper circuit includes an inductive element connected with the powered system. The resistive element is configured to be connected with the breakover device. The breakover device is in the non-conducting state prior to a discharge event from the powered system to prevent the current from the power source from being conducted through the resistive element. The breakover device is configured to change to the conducting state responsive to the powered system discharging current from or into the helper circuit in the discharge event. The breakover device conducts the current that is discharged through the resistive element.

In another embodiment, a method includes conducting current between a powered system and a helper circuit that includes an inductive element connected with the powered system and, responsive to one or more of the powered system discharging current into the helper circuit in a discharge event or the powered system operating as a short circuit, changing a state of a breakover device connected with a resistive element and connected with the powered system. The state of the breakover device changes from a non-conducting state to a conducting state. The method also includes reducing electric energy of the current that is discharged from the powered system into the helper circuit by conducting the current that is discharged through the resistive element.

In another embodiment, a circuit assembly includes first and second inductive elements and a capacitive element. The first inductive element is configured to be disposed in a helper circuit that exchanges energy with and stores energy from a powered system. The capacitive element is configured to be conductively coupled with the inductive element in the helper circuit. The second inductive element is configured to be outside of the helper circuit and is configured to be magnetically coupled with the first inductive element to reduce inductance of the first inductive element responsive to the powered system discharging a current back into the helper circuit.

BRIEF DESCRIPTION OF THE DRAWINGS

The subject matter described herein may be understood from reading the following description of non-limiting embodiments, with reference to the attached drawings, wherein.

DETAILED DESCRIPTION

One or more embodiments of the inventive subject matter described herein relate to circuit assemblies and methods that protect active devices in a high voltage circuit from unwanted discharges (e.g., spits) from a powered system that is powered via the circuit. The active devices can include switches in a gate drive or other control unit that controls the exchange of energy with and/or storage of energy from the powered system, such as a high voltage system that operates using high voltages (e.g., voltages in excess of 1,000 volts, in excess of 10,000 volts, in excess of 100,000 volts, up to 140,000 volts, or another limit). These systems can include, by way of example, CT imaging systems, generators, or other types of high voltage systems.

The circuit assemblies can protect active devices (e.g., active switches in a gate driver) on-site or locally by leveraging existing components in the main topology of a helper circuit and by adding a few relatively inexpensive additional components. The circuit assemblies provide distributed protection systems that dissipate the total energy of spits (e.g., current discharges from the powered systems) on or across the sum of the components forming the protection systems. Distributing the dissipation of the high voltage energy across several components results in the amount of energy that is dissipated per each protecting component being small. This, in turn, causes the protection systems to be small and compact, which may be needed for some powered systems (e.g., CT systems, interventional generators, etc.).

Figure 1:
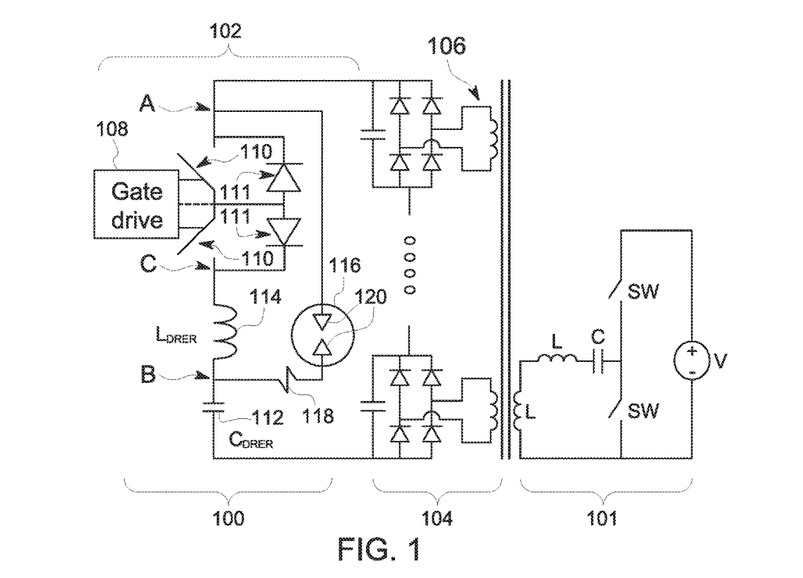
FIG. 1 illustrates one embodiment of a protection circuit assembly.

FIG. 1 illustrates one embodiment of a protection circuit assembly 100. The circuit assembly 100 is conductively coupled with a helper circuit 102 and a powered system 104. A power supply 101 is inductively coupled with the powered system 104 by inductors 106. The power supplied from the power supply 101 is coupled inductively into the inductors 106, and then rectified to a high voltage. The circuit 102 transitions the voltage level back and forth between two levels, without using the power supply 101 by storing the energy in a capacitive element 112. The powered system 104 can represent a variety of systems that consume high voltages to operate, such as CT imaging systems, and/or systems that generate high voltages, such as generators.

The helper circuit 102 includes a gate driver or gate drive 108. The gate drive unit 108 controls several active switches 110, such as solid-state semiconductor switches that control conduction of current from the powered system 104 to the helper circuit 102 via diodes 111. Several active switches 110 may be conductively coupled with or included in the helper circuit 102, as shown in FIG. 1.

In the illustrated embodiment, the helper circuit 102 also includes the capacitive element 112 (also shown as $C_{DRER}$ in FIG. 1) and an inductive element 114 (also shown as $L_{DRER}$ in FIG. 1). The capacitive and inductive elements 112, 114 are conductively coupled with each other. In operation, the gate drive 108 controls conduction of current between the powered system 104 and the helper circuit 102. The capacitive element 112 represents one or more capacitors that become charged with energy by this current. In the event of high voltages being conducted to the powered system 104, the capacitive element 112 may store a large amount of energy (e.g., the energy stored in a 39 to 68 nanofarad capacitor from 100,000 volts supplied to the powered system 104 from the gate drive 108). If the powered system 104 were to generate a spit (e.g., a high energy discharge of current back into the helper circuit 102, such as the energy that is generated when the powered system 104 discharges 100,000 volts or more into the helper circuit 102 over a time period of one to five milliseconds), then the discharged current of the spit and/or the energy stored in the capacitive element 112 may be too large for the inductive element 114 to block from reaching the switches 110. As a result, the discharge can damage or destroy the switches 110 and/or diodes 111. In one embodiment, the inductive element 114 can include an inductor having a relatively low inductance, such as 720 to 1200 microHenry.

The helper circuit 102 can operate to prevent damage to the gate drive 108 and/or other components that otherwise would be caused by the discharge from the powered system 104 (e.g., the active switches 110). The protection circuit assembly 100 distributes the energy of the discharge among several different components, some of which are included in the helper circuit 102, such that each of the components discharges a portion of the total energy that is discharged (instead of any one component discharging all of the discharged energy).

The protection circuit assembly 100 includes a breakover device 116 and a limiting resistive element 118 connected to each other. The breakover device 116 and the limiting resistive element 118 are connected to the helper circuit 102 and the powered system 104. In the illustrated embodiment, the breakover device 116 and the limiting resistive element 118 are connected with the gate drive 108 and is connected with the powered system 104. The protection circuit assembly 100 also includes the inductive element 114. The inductive element 114 may be included in both the helper circuit 102 and the protection circuit assembly 100. For example, the breakover device 116 and the limiting resistive element 118 may be added to an existing helper circuit 102 and use the inductive element 114 as described herein to protect the switches 110 and/or diodes 111 from damage due to spits caused by the powered system 104.

The limiting resistive element 118 can represent one or more resistors. The resistive element 118 can have a low resistance relative to the high voltage that is conducted in the helper circuit 102, such as fitly ohms or less. Optionally, the resistive element 118 can provide a resistance of another value. As described herein, the resistive element 118 can dissipate (e.g., absorb) at least some of the discharge from the powered system 104. The breakover device 116 can represent one or more passive devices that change conductivity responsive to occurrence of a discharge event. During normal operation when current is conducted to the high voltage system 104 but the high voltage system 104 does not discharge a high voltage back into the helper circuit 102, the breakover device 116 operates as an open component in the protection circuit assembly 100. For example, the breakover device 116 can act as an opening in the conductive path of the breakover device 116 and the limiting resistive element 118. As a result, current from the gate drive 108 is not conducted along the protection circuit assembly 100 through the breakover device 116 or limiting resistive element 118.

But, in response to a discharge or spit event (e.g., where the powered system 104 generates a voltage discharge over a short time period), the breakover device 116 can function in a different manner. The energy of the discharge can cause the breakover device 116 to begin conducting at least a portion of the discharged current from the powered system 104. The breakover device 116 can act as a closing in the conductive path of the breakover device 116 and the limiting resistive element 118. As a result, current from the discharge is conducted along the protection circuit assembly 100 through the breakover device 116 and is at least partially dissipated or absorbed by the limiting resistive element 118.

The breakover device 116 may not begin conducting the discharged voltage immediately upon the powered system 100 discharging the current due to limitations of the device 116. Instead, the inductive element 114 may dissipate or absorb a first portion and/or block a second portion of the discharged energy during a first time period to limit the energy or current conducted to the switches 110 and/or diodes 111. This first time period may last for several milliseconds, such as one to five milliseconds or another duration. Then, the energy in the discharge may change the breakover device 116 from an opening in the circuit to a closing in the circuit such that the breakover device 116 begins conducting the discharged voltage to the limiting resistive element 118 to dissipate or absorb a second portion of the discharged energy during a subsequent, second time period. The net result is that the inductive element 114, the breakover device 116, and the limiting resistive element 118 operate together to dissipate the discharged energy and prevent the discharged energy from damaging or destroying the switches 110 and/or diodes 111.

Figure 2:
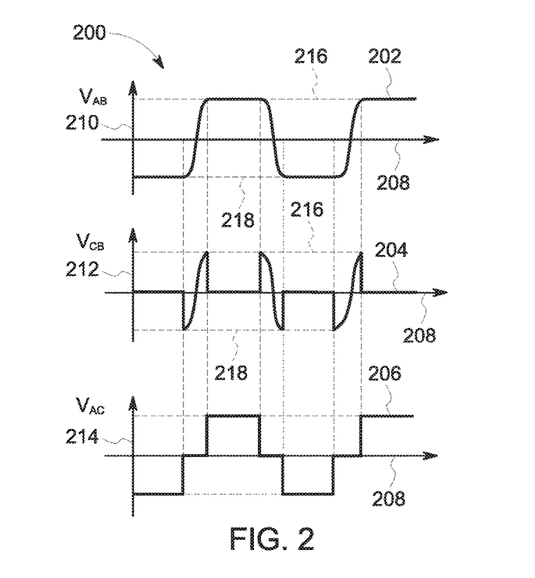
FIG. 2 illustrates several voltage waveforms within a helper circuit shown in FIG. 1 according to one example.

With continued reference to the protection circuit assembly 100 shown in FIG. 1, FIG. 2 illustrates several voltages 202, 204, 206 within the helper circuit 102 shown in FIG. 1 according to one example. The voltages 202, 204, 206 shown in FIG. 2 represent voltages measured between different locations in the helper circuit 102 at different times during normal operation of the powered system 104, such as when the powered system 104 does not generate a discharge or spit event. The voltages 202, 204, 206 are shown alongside a horizontal axis 208 representative of time and vertical axes 210, 212, 214 representative of magnitudes of the voltages 202, 204, 206. The scale of the horizontal axis 208 may be the same for the voltages 202, 204, 206 while the scales of the vertical axes 210, 212, 214 may differ for the voltages 202, 204, 206.

As shown in FIG. 1, the voltages 202 (also shown as $V_{AB}$ in FIG. 2) represent voltages measured between or across a first location A and a second location B in the helper circuit 102 where the protection circuit assembly 100 is coupled with and between the gate drive 108 and the powered system 104. The voltages 202 may represent the voltages applied across the protection circuit assembly 100.

The voltages 204 (also shown as $V_{CB}$ in FIG. 2) represent voltages measured between or across a third location C and the second location B in the helper circuit 102. The third location C includes the location where the active switches 110 are conductively coupled with the helper circuit 102 between the inductive element 114 and the gate drive 108. The voltages 204 can represent the voltages applied across the inductive element 114.

The voltages 206 (also shown as $V_{AC}$ in FIG. 2) represent voltages measured between or across the first location A and the third location C in the helper circuit 102. The voltages 206 can represent the voltages applied across the active switches 110 of the gate drive 108. The protection circuit assembly 100 can operate to prevent the voltages 206 from increasing above a designated, non-zero damage threshold that would cause damage or destroy the switches 110 and/or diodes 111.

During non-discharge operation of the powered system 104, the gate drive 108 may vary the voltage 202 between upper and lower limits 216, 218 to power the powered system 104. The changing voltage 202 can cause the voltage 204 to change, and the inductive element 114 and/or the capacitive element 112 can reduce the voltage 204 that is conducted to the switches 110 as shown in FIG. 2. For example, responsive to the voltage 202 being increased by the gate drive 108 toward the upper limit 216, the capacitive element 112 can store part of the voltage 202 and the inductive element 114 can allow the voltage 204 to increase to or toward the upper limit 216, and then decrease the voltage 204 toward zero to protect the switches 110 and/or diodes 111 from being exposed to increased positive voltage 204 for an extended period of time. Similarly, responsive to the voltage 202 being decreased by the gate drive 108 toward the lower limit 218, the capacitive element 112 can store part of the voltage 202 and the inductive element 114 can allow the voltage 204 to decrease to or toward the lower limit 218, and then increase the voltage 204 toward zero to protect the switches 110 and/or diodes 111 from being exposed to increasing negative voltage 204 for an extended period of time.

As a result, the inductive element 114 and the capacitive element 112 can operate to prevent the voltage 206 experienced by the active switches 110 and/or diodes 111 from becoming too large. As shown in FIG. 2, the voltage 206 across the active switches 110 remains between or within the limits 216, 218 during changes in the voltage 202 supplied by the gate drive 108. The absolute value of the voltage 206 may remain sufficiently small to protect the active switches 110 and/or diodes 111 from damage.

Figure 3:
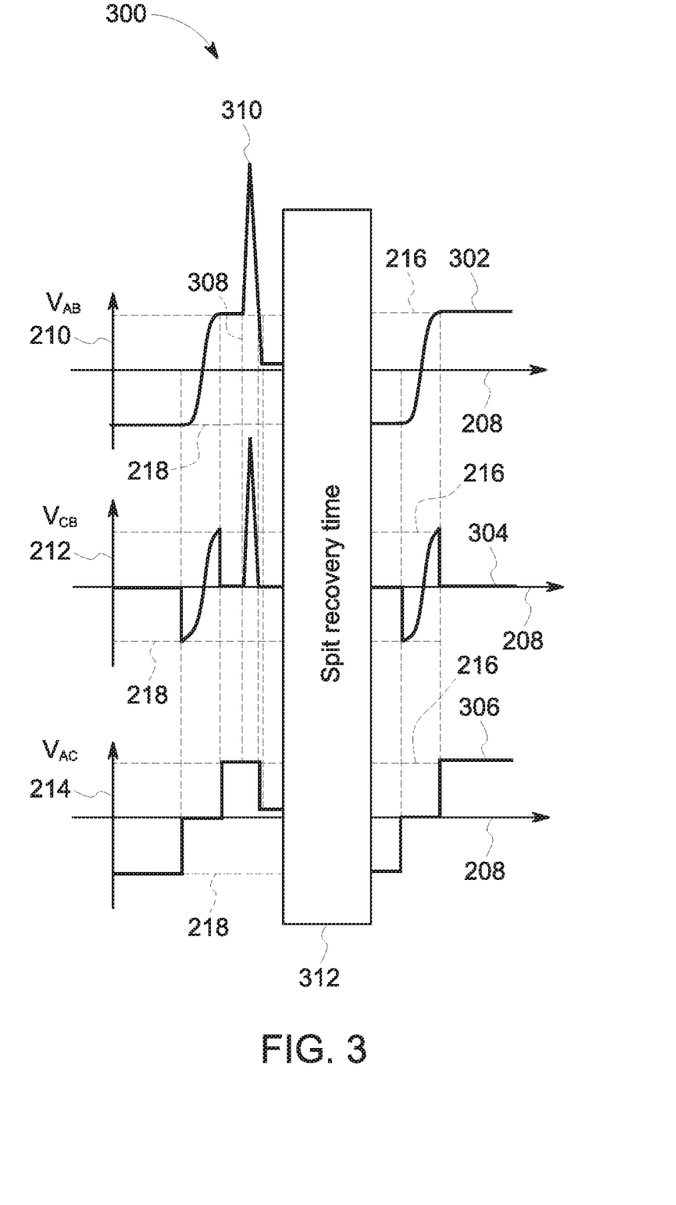
FIG. 3 illustrates several voltage waveforms within the helper circuit shown in FIG. 1 according to another example.

With continued reference to the protection circuit assembly 100 shown in FIG. 1, FIG. 3 illustrates several voltages 302, 304, 306 conducted within the helper circuit 102 shown in FIG. 1 according to one example. The voltages 302, 304, 306 shown in FIG. 3 represent voltages measured between different locations in the helper circuit 102 at different times during normal operation of the powered system 104, such as when the powered system 104 does not generate a discharge or spit event. The voltages 302, 304, 306 are shown alongside the horizontal axis 208 and the vertical axes 210, 212, 214 described above. The voltages 302 (also shown as $V_{AB}$ in FIG. 3) represent the voltages measured between or across the first location A and the second location B in the helper circuit 102, and can represent the voltages applied across the protection circuit assembly 100. The voltages 304 (also shown as $V_{CB}$ in FIG. 3) represent voltages measured between or across the third location C and the second location B in the helper circuit 102, and can represent the voltages applied across the inductive element 114. The voltages 306 (also shown as $V_{AC}$ in FIG. 3) represent voltages measured between or across the first location A and the third location C in the helper circuit 102, and can represent the voltages applied across the active switches 110.

Prior to a discharge or spit event, the voltages 302, 304, 306 may change similar to the voltages 202, 204, 206 shown in FIG. 2. A discharge or spit event occurs at a time 308 (shown alongside the voltage 302). The discharge event causes the voltages 302, 304 to rapidly increase. This rapid increase is caused by the powered system 104 discharging a large voltage (e.g., over 100,000 volts, up to 140,000 volts, or another amount) into the helper circuit 102. Following the time 308, the inductive element 114 may absorb the energy in the helper circuit 102 created by the discharged current. The voltages 302, 304 may continue to increase to a peak value 310 (shown alongside the voltage 302). During the time period where the voltages 302, 304 increase toward or to the peak value 310, the inductive element 114 may absorb energy of the discharge to protect the active switches 110 from being damaged or destroyed by the discharge.

During this same time period, the energy of the discharge may be converting or changing the state of the breakover device 116 from a non-conducting body to a conducting body. At or prior to the voltages 302, 304 reaching the peak 310, the breakover device 116 may change state and begin conducting the discharge current through the breakover device 116. Because the breakover device 116 and resistive element 118 are connected with each other, the discharged current that is conducted through the breakover device 116 is conducted into the resistive element 118. The resistive element 118 may dissipate some or all of the discharged current (e.g., as heat). As shown in FIG. 3, the voltages 302, 304 may decrease following the peak values 310 to or toward values of zero. The time period from the time 308 to the peak values 310 may be controlled by the inductive element 114. For inductive elements 114 having greater inductances, the time period from the time 308 to the peak values 310 may be longer than compared to inductive elements 114 with smaller inductances. This time period is sufficiently short to prevent damage to the active switches 110. The breakover device 116 changes state during or prior to expiration of this time period to allow the resistive element 118 to begin dissipating the discharged current before the inductive element 114 is unable to prevent the discharged current from damaging the active switches 110 and/or diodes 111.

As shown in the voltage 306, the breakover device 116, the inductive element 114, and the resistive element 118 prevent the voltage 306 from damaging or destroying the active switches 110 and/or diodes 111. The voltage 306 is prevented from increasing above the upper limit 216, which could destroy the active switches 110 and/or diodes 111, by the inductive element 114 absorbing an initial portion of the discharged current and the resistive element 118 absorbing a remaining portion of the discharged current. Following the decrease in the voltages 302, 304, 306, the gate drive 108 may stop conduction of voltage 202, 302 to the powered system 104 during a spit recovery time period 312. The gate drive 108 can include one or more sensors (e.g., voltmeters coupled with voltage dividers) to sense the voltage 202, 302 and may include one or more electronic, logic based devices (e.g., controllers, such as one or more processors, field programmable gate arrays, integrated circuits, etc.) to determine how to control the voltage 202, 302. This time period 312 can allow for the energy of the discharge to be dissipated from the helper circuit 102 and the protection circuit assembly 100. The breakover device 116 can change states and return to operating as an opening in the protection circuit assembly 100 to prevent conduction of current through the resistive element 118. Following the time period 312, the gate drive 108 can return to applying the voltage 202 to the powered system 104 to power the powered system 104. If another spit event occurs, then the inductive element 114 can prevent the initial discharged current from damaging the active switches 110 and/or diodes 111, and the breakover device 116 can change state to a conducting state, as described above. The protection circuit assembly 100 can operate to repeatedly protect the active switches 110 and/or diodes 111 from damage in response to multiple spit events by the powered system 104.

In one embodiment, the breakover device 116 includes a spark gap device. Such a spark gap device can include conductive electrodes 120 (shown in FIG. 1) spatially separated from each other by a gap. A gas between the electrodes may have a breakdown voltage and, responsive to the voltage 202, 302 exceeding the breakdown voltage of the gas, a spark forms that ionizes the gas to reduce the resistance of the gas to conduction of the discharge voltage. The breakover device 116 then switches states to become a conducting device until the conduction of current through the breakover device 116 drops below a designated threshold. The breakdown voltage of the breakover device 116 can be greater than the upper limit 216, and may be the value of the peak values 310 shown in FIG. 3.

Figure 4:
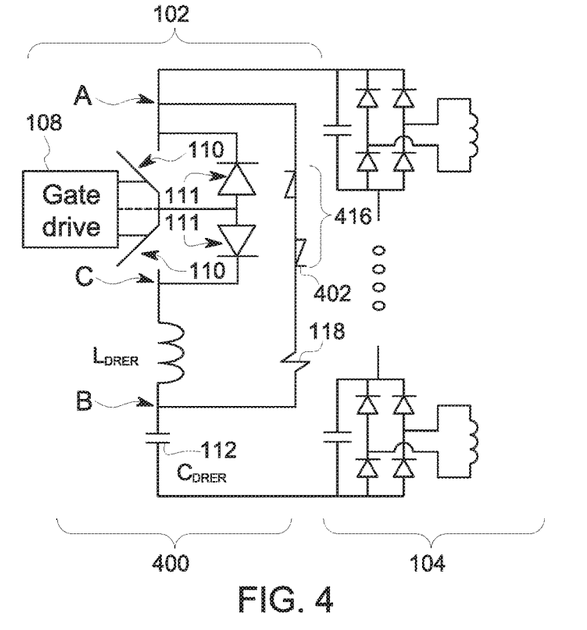
FIG. 4 illustrates another embodiment of a protection circuit assembly.

FIG. 4 illustrates another embodiment of a protection circuit assembly 400. The circuit assembly 400 is conductively coupled with the helper circuit 102 and the powered system 104 described above. The protection circuit assembly 400 can operate to prevent damage to the gate drive 108 and/or other components that otherwise would be caused by the discharge from the powered system 104. The protection circuit assembly 400 distributes the energy of the discharge among several different components, some of which are included in the helper circuit 102, such that each of the components discharges a portion of the total energy that is discharged (instead of any one component discharging ail of the discharged energy).

The protection circuit assembly 400 includes a breakover device 416 and the limiting resistive element 118 conductively coupled with each other. The breakover device 416 and the limiting resistive element 118 are conductively coupled with the helper circuit 102 and the powered system 104. In the illustrated embodiment, the breakover device 416 and the limiting resistive element 118 are connected with the gate drive 108 and is connected with the powered system 104. The protection circuit assembly 400 also includes the inductive element 114. The inductive element 114 may be included in both the helper circuit 102 and the protection circuit assembly 400. For example, the breakover device 416 and the limiting resistive element 118 may be added to an existing helper circuit 102 and use the inductive element 114 as described herein to protect the gate drive 108 from damage due to spits caused by the powered system 104.

The breakover device 416 can represent one or more passive devices that change conductivity responsive to occurrence of a discharge event. In the illustrated embodiment, the breakover device 416 represents two or more breakover diodes (BOD) 402 connected with each other. The BODs 402 can represent thyristors with four layer structures, but without gate connections to the thyristors. During normal operation when current is conducted to the powered system 104 but the powered system 104 does not discharge a high voltage back into the helper circuit 102, the breakover device 416 operates as an open component in the protection circuit assembly 400. For example, the breakover device 416 can act as an opening in the conductive path of the breakover device 416 and the limiting resistive element 118. As a result, current from the gate drive 108 is not conducted along the protection circuit assembly 400 through the breakover device 416 or limiting resistive element 118.

But, in response to a discharge or spit event (e.g., where the powered system 104 generates a current discharge over a short time period), the breakover device 416 can function in a different manner. The energy of the discharge can cause the BODs 402 in the breakover device 416 to begin conducting at least a portion of the discharged current from the powered system 104, similar to as described above. The breakover device 416 can act as a closing in the conductive path that connects the breakover device 416 and the limiting resistive element 118. As a result, current from the discharge is conducted along the protection circuit assembly 400 through the breakover device 416 and is at least partially dissipated or absorbed by the limiting resistive element 118, similar to as described above in connection with the breakover device 116 shown in FIG. 1.

Figure 5:
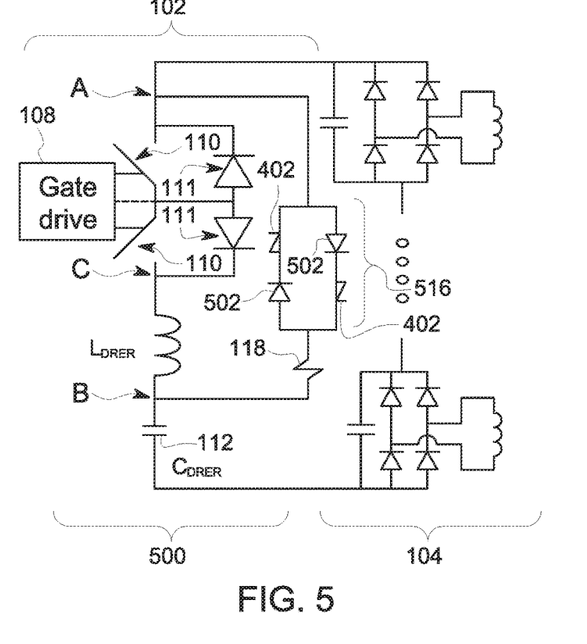
FIG. 5 illustrates another embodiment of a protection circuit assembly.

FIG. 5 illustrates another embodiment of a protection circuit assembly 500. The circuit assembly 500 is conductively coupled with the helper circuit 102 and the powered system 104 described above. The protection circuit assembly 500 can operate to prevent damage to the switches 110 and/or diodes 111 that otherwise would be caused by the discharge from the powered system 104. The protection circuit assembly 500 distributes the energy of the discharge among several different components, some of which are included in the helper circuit 102, such that each of the components discharges a portion of the total energy that is discharged (instead of any one component discharging all of the discharged energy).

The protection circuit assembly 500 includes a breakover device 516 and the limiting resistive element 118 conductively coupled with each other. The breakover device 516 and the limiting resistive element 118 are conductively coupled with the helper circuit 102 and the powered system 104. In the illustrated embodiment, the breakover device 516 and the limiting resistive element 118 are connected with the gate drive 108 and is connected with the powered system 104. The protection circuit assembly 500 also includes the inductive element 114. The inductive element 114 may be included in both the helper circuit 102 and the protection circuit assembly 500. For example, the breakover device 516 and the limiting resistive element 118 may be added to an existing helper circuit 102 and use the inductive element 114 as described herein to protect the switches 110 and/or diodes 111 from damage due to spits caused by the powered system 104.

The breakover device 516 can represent one or more passive devices that change conductivity responsive to occurrence of a discharge event. In the illustrated embodiment, the breakover device 516 represents BODs 402 connected with non-breakover diodes 502. The breakover device 516 includes plural sets of BODs 402 and diodes 502, with each set including a BOD 402 and a diode 502. The diodes 502 may be conductively coupled with the BODs 402 such that the breakover device 516 operates to stop or conduct current in opposite directions. For example, the breakover device 516 may be a bi-directional breakover device 516 that can conduct current in a direction from location A toward location B and can conduct current in an opposite direction from location B toward. location A. The diodes 502 allow current to be conducted in these opposite directions, with the BODs 402 coupled to cathodes of the diodes 502.

During normal operation when current is conducted to the powered system 104 but the powered system 104 does not discharge a high voltage back into the helper circuit 102, the breakover device 516 operates as an open component in the protection circuit assembly 500. For example, the breakover device 516 can act as an opening in the conductive path of the breakover device 516 and the limiting resistive element 118. As a result, current from the gate drive 108 is not conducted along the protection circuit assembly 500 through the breakover device 516 or limiting resistive element 118.

But, in response to a discharge or spit event (e.g., where the powered system 104 generates a current discharge over a short time period), the breakover device 516 can function in a different manner. The energy of the discharge can cause the BODs 402 in the breakover device 516 to begin conducting at least a portion of the discharged current from the powered system 104. One of the BODs 402 can allow current to be conducted in one direction (e.g., from location A, through the diode 502, through the DOD 402, through the resistive element 118, and then to the location B) while another BOD 402 can allow current to be conducted in another direction (e.g., from location B, through the resistive element 118, through the diode 502, through the BOD 402, and then to the location A). In either direction, the discharged current is conducted through the resistive element 118 to dissipate the energy of the discharged current, similar to as described above in connection with the breakover device 116 shown in FIG. 1.

Figure 6:
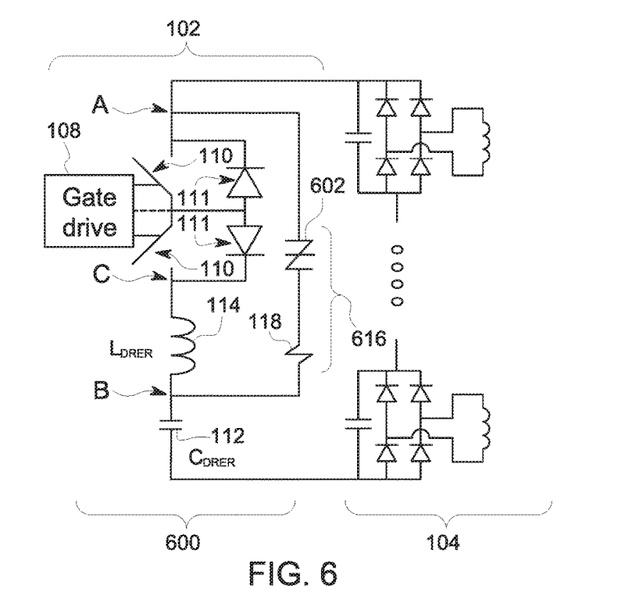
FIG. 6 illustrates another embodiment of a protection circuit assembly.

FIG. 6 illustrates another embodiment of a protection circuit assembly 600. The circuit assembly 600 is conductively coupled with the helper circuit 102 and the powered system 104 described above. The protection circuit assembly 600 can operate to prevent damage to the switches 110 and/or diodes 111 that otherwise would be caused by the discharge from the powered system 104. The protection circuit assembly 600 distributes the energy of the discharge among several different components, some of which are included in the helper circuit 102, such that each of the components discharges a portion of the total energy that is discharged (instead of any one component discharging all of the discharged energy).

The protection circuit assembly 600 includes a breakover device 616 and the limiting resistive element 118 conductively coupled with each other. The breakover device 616 and the limiting resistive element 118 are conductively coupled with the helper circuit 102 and the powered system 104. In the illustrated embodiment, the breakover device 616 and the limiting resistive element 118 are connected with the gate drive 108 and is connected with the powered system 104. The protection circuit assembly 600 also includes the inductive element 114. The inductive element 114 may be included in both the helper circuit 102 and the protection circuit assembly 600. For example, the breakover device 616 and the limiting resistive element 118 may be added to an existing helper circuit 102 and use the inductive element 114 as described herein to protect the switches 110 and/or diodes 111 from damage due to spits caused by the powered system 104.

The breakover device 616 can represent one or more passive devices that change conductivity responsive to occurrence of a discharge event. In the illustrated embodiment, the breakover device 616 includes a silicon diode for alternating current (SIDAC) 602. During normal operation when current is conducted to the powered system 104 but the powered system 104 does not discharge a high voltage back into the helper circuit 102, the breakover device 616 operates as an open component in the protection circuit assembly 600. For example, the breakover device 616 can be nonconducting until the voltage applied to the breakover device 616 meets or exceeds a designated threshold voltage. The discharge current from the powered system 104 can exceed this threshold and cause the breakover device 616 to switch to a conducting state, as described herein. Discharged current is conducted through the resistive element 118 to dissipate the energy of the discharged current, similar to as described above in connection with the breakover device 116 shown in FIG. 1. Once the discharge current drops below the threshold, the breakover device 616 can change states to a nonconducting state, also as described herein.

In one or more of the embodiments of the helper circuits 102 and protection circuit assemblies described herein, oscillation of the discharge current from a spit event between the inductive element 114 and the capacitive element 112 may cause damage or destruction of the active switches 110. For example, the inductive element 114, capacitive element 112, and the powered system 104 may form an oscillating resistor-inductor-capacitor (RLC) circuit in which the discharged current oscillates between the inductive element 114 and capacitive element 112. This oscillation may cause damage to the switches 110 and/or diodes 111, such as by destroying the active switches 110.

Figure 7:
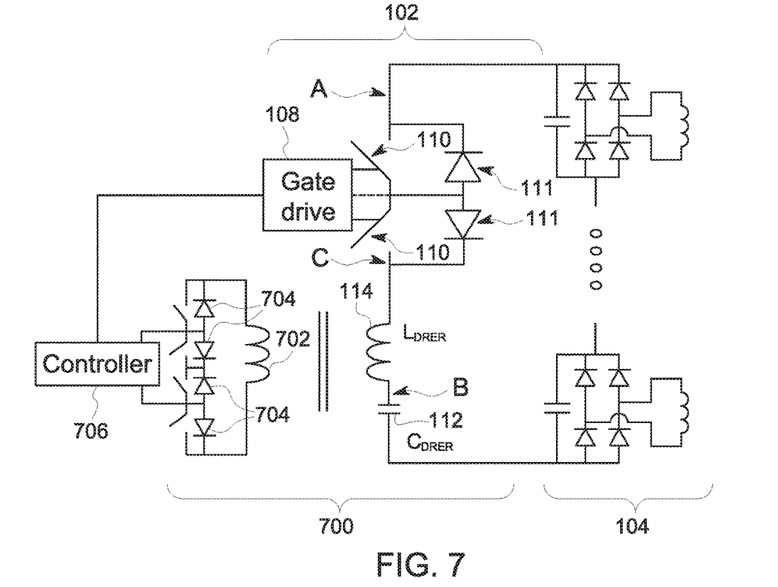
FIG. 7 illustrates another embodiment of a protection circuit assembly.

FIG. 7 illustrates another embodiment of a protection circuit assembly 700. The circuit assembly 700 is conductively and/or inductively coupled with the helper circuit 102 and the powered system 104 described above. The protection circuit assembly 700 can operate to prevent damage to the switches 110 and/or diodes 111 that otherwise would be caused by oscillation of the current discharged from the powered system 104. The protection circuit assembly 700 changes the state of the inductive element 114 in the helper circuit 102 to change whether the inductive element 114 operates as an inductor or a conductive body.

The protection circuit assembly 700 includes an additional inductive element 702 that is magnetically coupled with the inductive element 114 in the helper circuit 102. The inductive elements 114, 702 may be magnetically coupled with each other by a magnetic field that is generated by the inductive element 702 upon receipt of current from a controller 706. The controller 706 can represent one or more electronic logic-based devices, such as one or more processors, field effect programmable arrays, integrated circuits, etc. The controller 706 can include and/or be connected with a power supply, such as the same or different power supply that provides the current provided to the powered system 104 by the gate drive 108. The controller 706 controls one or more switches 704 (e.g., solid state semiconductor switches) to cause the inductive element 702 to create a magnetic field and thereby be magnetically coupled with the inductive element 114.

The inductive elements 114, 702 may be magnetically coupled when the inductive element 702 generates a magnetic field that causes the inductive element 114 to allow current to be conducted through the inductive element 114 without the inductive element 114 stopping or dissipating the current. The magnetic coupling can cause the inductance provided by the inductive element 112 to the helper circuit 102 to be eliminated or substantially reduced (e.g., reduced by at least 90%, at least 80%, at least 70%, or another value). For example, the inductive elements 114, 702 may be magnetically coupled to cause the inductive element 114 to operate as a conductive body, such as a wire or conductive bus, instead of operating as an inductor.

In operation, the gate drive 108 and/or controller 706 can monitor the voltage 202, 302 (shown in FIGS. 2 and 3) conducted in the helper circuit 102 to the powered system 104. The gate drive 108 and/or controller 706 can include one or more sensors, such as voltmeters connected with voltage dividers, for monitoring the voltages in the helper circuit 102. In normal operation (e.g., prior to or after a spit event), the controller 706 may open one or more (or all) of the switches 704 to prevent the inductive element 702 from being powered to generate a magnetic field (and thereby prevent the inductive elements 702, 112 from being magnetically coupled). As a result, the inductive element 114 operates as an inductor and the voltages 202, 204, 206 (shown in FIG. 2) conducted in the helper circuit 102 vary as shown in FIG. 2.

In response to detection of a spit event, the controller 706 may close the switches 704 to cause the inductive element 702 to generate a magnetic field. This magnetic field causes the inductive elements 114, 702 to be magnetically coupled. This magnetic coupling causes the inductive element 114 to operate as a conductive body, and not an inductor. As a result, the inductive element 114 is effectively removed from the helper circuit 102 and replaced with a conductive body. Removal of the inductive element 114 eliminates or prevents creation of an RLC circuit in the helper circuit 102. Consequently, the current discharged from the powered system 104 does not oscillate between the inductive element 114 and the capacitive element 112, and does not oscillate through or across the switches 110. Instead, the non-oscillating current may dissipate through the switches 110 without damaging or destroying the switches 110 and/or diodes 111.

Figure 8:
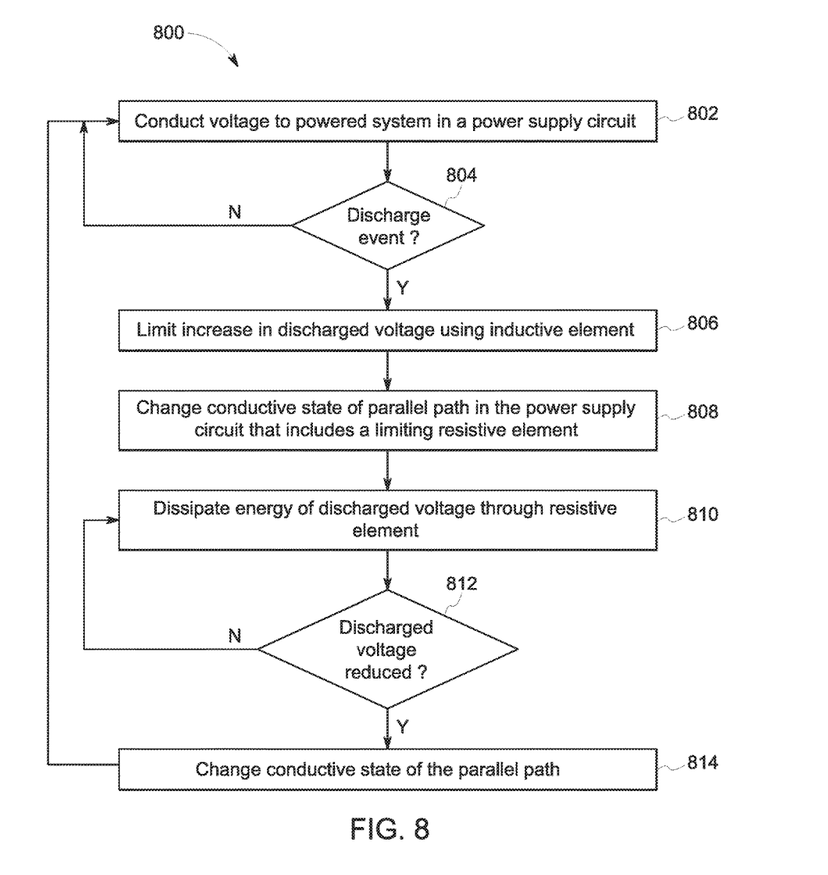
FIG. 8 illustrates a flowchart of one embodiment of a method for protecting components of a helper circuit from discharge or spit events.

FIG. 8 illustrates a flowchart of one embodiment of a method 800 for protecting components of a helper circuit from discharge or spit events. The method 800 may be performed by one or more embodiments of the protection circuit assemblies and/or helper circuits described herein. At 802, current is conducted to a powered system in a helper circuit. The current may be a high voltage as described herein, The helper circuit may include a capacitive element and/or an inductive element connected with the powered system. The powered system may create discharge events, which can involve current being discharged from the powered system back into the helper circuit. The magnitude of the discharged currents can be significant and the discharge can occur over a short time period. The discharged currents can damage or destroy components of the helper circuit.

At 804, if a discharge event occurs, flow of the method 800 may proceed toward 806 to protect components of the helper circuit from damage or destruction. If no discharge event occurs, then flow of the method 800 can return toward 802 to continue supplying current to the powered system unless or until a discharge event occurs (or the method 800 terminates).

At 806, an increase in discharged current that is conducted through the helper circuit is limited using the inductive element in the helper circuit and/or the protective circuit assembly. As described above, the inductive element may be included in one or both of the helper circuit and the protective circuit assembly. The inductive element may limit or reduce the amount of current that is conducted through the inductive element to components such as to the active switches and/or diodes. Due to the large amount of energy in the discharged current, however, the inductive element may only be able to absorb or dissipate an initial portion, but not all, of the discharged current.

At 808, a conductive state of a path in the helper circuit is changed. The path may include the protective circuit assembly that includes a limiting resistive element and may be connected with the gate drive. Prior to the spit event, the path may be in a none-conductive state such that no current is conducted along the path. But, the energy of the discharged current from the spit event can build up and change the conductive state of the path from non-conductive to conductive. For example, a breakover device (e.g., a spark gap, BOD, SIDAC, thyristor, or the like) may be connected with the limiting resistive element and be non-conductive until the energy of the discharged current from the spit event causes the breakover device to begin conducting the discharged current along the path.

At 810, energy of the discharged current from the spit event is dissipated through the limiting resistive element. The discharged current (or at least the portion of the discharged current that was not absorbed or dissipated by the inductive element) is dissipated by the limiting resistive element. For example, a resistor may dissipate the discharged current as heat. Prior to the conductive state of the path being changed to conductive, the current conducted in the helper circuit may not pass through the limiting resistive element. At 812, if the discharged current is reduced by the inductive element and the resistive element to an extent that the switches and/or diodes are not damaged, then flow of the method 800 may proceed toward 814. But, if additional energy of the discharged current needs to be reduced to prevent damage to the switches and/or diodes, then flow of the method 800 may return toward 810 until the energy of the discharged current has dropped enough to prevent the damage.

At 814, the conductive state of the path is changed. For example, as the energy of the discharged current drops to prevent damage or destruction of the switches and/or diodes, the breakover device may change from the conductive state to a non-conductive state. This change can prevent additional current from being conducted through the resistive element. As a result, the gate drive can return to supplying current to the powered system through the helper circuit without the current being conducted and reduced by the limiting resistive element. Flow of the method 800 may return toward 802 or may terminate.

The above description is illustrative and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein," Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

As used herein, an element or step recited in the singular and proceeded with the word "a" or "an" should be understood as not excluding plural of said elements or steps, unless such exclusion is explicitly stated. Furthermore, references to "one embodiment" of the inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

The foregoing description of certain embodiments of the inventive subject matter will be better understood when read in conjunction with the appended drawings. To the extent that the figures illustrate diagrams of the functional blocks of various embodiments, the functional blocks are not necessarily indicative of the division between hardware circuitry. The various embodiments are not limited to the arrangements and instrumentality shown in the drawings.

This written description uses examples to disclose several embodiments of the inventive subject matter and also to enable a person of ordinary skill in the art to practice the embodiments of the inventive subject matter, including making and using any devices or systems and performing any incorporated methods. The patentable scope of the inventive subject matter is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A circuit assembly comprising:
a breakover device that changes conductivity responsive to a discharge event, configured to change states from a non-conducting state to a conducting state responsive to a change in electric energy in a helper circuit topology that exchanges energy with and stores the energy from a powered system, the helper circuit topology including an inductive element, the inductive element configured to limit a first portion and/or block a second portion of a current discharged from the discharge event; and
a limiting resistive element configured to be connected with the breakover device and configured to limit the second portion of the discharged current subsequently,
wherein the breakover device is in the non-conducting state prior to the discharge event from the powered system to prevent the current from the powered system from being conducted through the limiting resistive element, and
wherein the breakover device is configured to change to the conducting state responsive to the powered system discharging current into the helper circuit topology in the discharge event, the breakover device conducting the current that is discharged from the powered system through the limiting resistive element to reduce the electric energy in the helper circuit topology from the current that is discharged.

2. The circuit assembly of claim 1, wherein the breakover device is configured to change to the conductive state to dissipate the electric energy from the current that is discharged from the powered system to protect one or more active switches from damage.

3. The circuit assembly of claim 2, wherein the breakover device is configured to change to the conductive state to dissipate the electric energy from the current that is discharged from the powered system to protect one or more diodes connected with the one or more active switches from damage.

4. The circuit assembly of claim 1, wherein the breakover device and the limiting resistive element are configured to be connected with the powered system.

5. The circuit assembly of claim 1, wherein the helper circuit topology also includes a capacitive element connected with the inductive element, and the breakover device and the limiting resistive element are configured to be connected with the helper circuit topology between the capacitive element and the inductive element.

6. The circuit assembly of claim 1, wherein the breakover device includes a spark gap device.

7. The circuit assembly of claim 1, wherein the breakover device includes a breakover diode.

8. The circuit assembly of claim 1, wherein the breakover device includes breakover diodes connected with non-breakover diodes.

9. The circuit assembly of claim 8, wherein the breakover device includes at least a first set of a first breakover diode connected with a first non-breakover diode that is configured to conduct the current that is discharged from the powered system along a first direction and a second set of a second breakover diode connected with a second non-breakover diode that is configured to conduct the current that is discharged along an opposite, second direction.

10. The circuit assembly of claim 1, wherein the breakover device includes a silicon diode for alternating current.

11. A method comprising:
conducting current between a powered system and a helper circuit topology that includes an inductive element, the inductive element configured to limit a first portion and/or block a second portion of a current discharged from the discharge event;
responsive to one or more of the powered system conducting energy of the current into the helper circuit topology in the discharge event or the powered system operating as a short circuit, changing a state of a breakover device that changes conductivity responsive to a discharge event and connected with a limiting resistive element and connected with the power source, the state of the breakover device changing from a non-conducting state to a conducting state, and the limiting resistive element limiting a second portion of the discharged current subsequently; and reducing electric energy of the current that is discharged from the powered system into the helper circuit topology by conducting the current that is discharged through the limiting resistive element.

12. The method of claim 11, wherein reducing the electric energy of the current that is discharged from the powered system protects one or more active switches of the helper circuit topology from damage.

13. The method of claim 12, wherein reducing the electric energy of the current that is discharged from the powered system protects one or more diodes coupled with the one or more active switches from damage.

14. The method of claim 11, wherein the state of the breakover device changes after the electric energy of the current that is discharged from the powered system is reduced.

15. The method of claim 14, wherein the state of the breakover device changes only after expiration of an initial period of time following the discharge event with the inductive element reducing a first portion of the electric energy in the helper circuit topology from the current that is discharged from the powered system and the limiting resistive element configured to reduce a different, second portion of the electric energy in the helper circuit topology from the current that is discharged.

16. A circuit assembly comprising:
a first inductive element configured to be disposed in a helper circuit topology that conductively couples a power source with a powered system that is powered by the power source;

a capacitive element configured to be conductively coupled with the inductive element between the powered system and the power source in the helper circuit topology; and a second inductive element configured to be outside of the helper circuit topology, the second inductive element configured to be magnetically coupled with the first inductive element to reduce inductance of the first inductive element responsive to the powered system discharging a current back into the helper circuit topology.

17. The circuit assembly of claim 16, wherein the second inductive element is configured to be magnetically coupled with the first inductive element to stop oscillation of the current that is discharged into the helper circuit topology from the powered system.

18. The circuit assembly of claim 17, wherein the second inductive element is configured to stop the oscillation of the current that is discharged from the powered system between the first inductive element and the second inductive element to prevent damage to one or more active switches in the helper circuit topology.

19. The circuit assembly of claim 16, wherein the second inductive element is configured to be magnetically de-coupled from the first inductive element responsive to an electric energy of the current that is discharged from the powered system reducing.

20. The circuit assembly of claim 19, wherein the first inductive element is configured to increase the inductance of the first inductive element responsive to the second inductive element magnetically de-coupling from the first inductive element.

* * * * *